United States Patent Office 3,488,741
Patented Jan. 6, 1970

3,488,741
PROCESS FOR THE MANUFACTURE OF 1,2,4-TRIMETHYL-5-ISOPROPYLBENZENE
Helmut Muller, Gladbeck, Germany, assignor to Gelsenberg Benzin Aktiengesellschaft, Gelsenkirchen, Germany
No Drawing. Filed Jan. 29, 1968, Ser. No. 701,108
Claims priority, application Germany, Feb. 17, 1967, G 49,308
Int. Cl. C07c 3/56
U.S. Cl. 260—671                                                              7 Claims

ABSTRACT OF THE DISCLOSURE

Improvement in the reaction of pseudocumene with propene to produce 1,2,4-trimethyl-5-isopropylbenzene in the presence of an aluminum chloride catalyst wherein the reaction is accomplished in the further presence of trimethyldiisopropylbenzenes whereby permitting a reduction in the amount of excess propene required for the reaction.

---

Reference is made to copending application Ser. No. 640,369 filed May 22, 1967 now U.S. Patent No. 3,435,091, which is itself a continuation-in-part of application Ser. No. 514,394 filed Dec. 16, 1965, now abandoned. All subject matter of these copending patent applications is incorporated herein by reference.

The alkylation of pseudocumene with propene is generally known. In the art-recognized processes the alkylating agent, propene is generally used in less than equimolar ratio with respect to the pseudocumene. The excess pseudocumene in the prior art processes is recycled.

In the above-identified patent applications, this known process has been improved by the discovery that if the propene reactant is used in excess in the presence of an aluminum chloride containing catalyst, the products produced are such as to be more readily resolved by relatively simple chemical engineering techniques. In this improved process the principal by-product or impurity is trimethyldiisopropylbenzene which is separable from trimethylisopropylbenzene by distillation operations, since the difference in the boiling points of these two materials amounts to about 40° C.

Although the process described in the above-identified patent applications works quite well, and produces a good grade of 1,2,4-trimethyl-5-isopropylbenzene, significant quantities of the diisopropyl compound are produced which is obviously economically undesirable.

It is therefore an object of this invention to provide an improved process for alkylating pseudocumene with propene.

It is another object of this invention to provide such a process which is economically more attractive.

It is a further object of this invention to provide such a process which has improved yields of desired product.

Other and additional objects of this invention will become apparent from a consideration of this entire specification including the claims hereof.

In accord with and fulfilling these objects, one aspect of this invention resides in alkylating pseudocumene with propene in at least equimolar proportions in contact with an aluminum chloride containing catalyst in the further presence of added trimethyldiisopropylbenzenes.

When practicing the process of the above-identified copending applications, if pseudocumene is alkylated with propene in a molar ratio 1:1.25, for example, one obtains, in addition to a fraction that is rich in 1,2,4-trimethyl-5-isopropylbenzene, 25 mole-percent of trimethyldiisopropylbenzenes. In other words, 25 wt.-percent of the pseudocumene and 40 wt.-percent of the propene that go into the process are separated from the process in the form of trimethyldiisopropylbenzenes.

It has now been found that these disadvantages can be eliminated or reduced, while nevertheless achieving high selectivity, if the process of the parent applications is modified according to this invention, wherein trimethyldiisopropylbenzenes are added beforehand to the pseudocumene. The amount of propene needed may then be correspondingly smaller. In other words, up to as much trimethyldiisopropylbenzenes are to be added as would otherwise be produced due to overalkylation. By overalkylation is meant addition of all of the reacted propene which is added to the pseudocumene over and above the molar ratio of 1:1. In practice it will be preferable to overalkylate only once and then recirculate the trimethyldiisopropylbenzenes in the product.

If pseudocumene is alkylated with propene in the manner of the parent applications, in a molar ratio of 1:1.25, 75 mole-percent of 1,2,4-trimethylisopropylbenzenes are obtained (of which about 83% by weight will be 1,2,4-trimethyl-5-isopropylbenzene) plus 25 mole-percent of trimethyldiisopropylbenzenes. If 75 mole-percent of pseudocumene and 25 mole-percent of trimethyldiisopropylbenzenes are used in the next alkylation and only one mole of propene is used per mole of pseudocumene, the composition of the alkylate will again be 75 mole-percent 1,2,4-trimethylisopropylbenzenes (of which about 83% by weight will be 1,2,4-trimethyl-5-isopropylbenzene) and 25 mole-percent trimethyldiisopropylbenzenes. Thus with reference to the starting pseudocumene in the second alkylation, one obtains, with a molar ratio of pseudocumene:propene of 1:1, a yield of 100 mole-percent of 1,2,4-trimethylisopropylbenzenes. In other words, the yield is substantially better than in the method previously known, with the same selectivity. The trimethyldiisopropylbenzenes produced in the second alkylation can be re-used for the next batch. Similarly in a continuous operation, the diisopropylbenzenes in the product can be continually recycled.

The process can be performed by adding the AlCl$_3$ used as catalyst to pseudocumene and trimethyldiisopropylbenzenes, and immediately introducing the propene at 30 to 50° C., or by letting the AlCl$_3$ act on the starting mixture at 30 to 50° C. until all of the trimethyldiisopropylbenzenes have been transformed by 1,2,4-trimethylisopropylbenzenes by transalkylation and then add propene. If the latter method is used, precisely the same product composition is obtained after the transalkylation stage from 75 mole-percent of pseudocumene and 25 mole-percent of trimethyldiisopropylbenzenes as would be obtained if pure pseudocumene were alkylated with 0.5 mole of propene, namely 50 mole-percent pseudocumene and 50 mole-percent 1,2,4-trimethylisopropylbenzenes.

The selectivity and yields of the process can be seen from the following non-limiting examples:

EXAMPLE I 540 g. of pseudocumene and 306 g. of trimethyldiisopropylbenzenes containing 3% by weight of propene oligomers were mixed together with 6 grams of AlCl$_3$ and stirred for one hour at 50° C. After this period the product had the following composition: 342 g. of pseudocumene, 484 g. of 1,2,4-trimethylisopropylbenzenes and 20 g. of propene oligomers.

After the 1-hour transalkylation, 191 grams of propene were introduced into this mixture at 50° C. 1037 grams of alkylate were produced having the following composition: 751 g. of 1,2,4-trimethylisopropylbenzenes, of which 82.9% by weight is 1,2,4-trimethyl-5-isopropylbenzene, 272 g. of trimethyldiisopropylbenzenes and 14 g. of propene oligomers.

In other words, out of 540 g. of pseudocumene and 191 g. of propene, 751 g. were produced of a 1,2,4-trimethylisopropylbenzene fraction rich in 1,2,4-trimethyl-5-isopropylbenzene. A 100 mole-percent transformation of the pseudocumene to the desired fraction has been achieved without consuming more than 1 mole of propene per mole of pseudocumene for the purpose. The 20 g. of 1,2,4-trimethylisopropylbenzenes that have developed over and above the 100 mole-percent, were formed at the expense of the 1,2,4-trimethyldiisopropylbenzene fraction. This is due to the margin of error in the measurement of the small amount of propene.

EXAMPLE II

The same quantities and conditions obtained as in Example I, but the propene was introduced immediately after the addition of the AlCl$_3$, which was not the case in Example I. The alkylate that developed had the same composition as in Example I.

What is claimed is:

1. In the process for producing 1,2,4-trimethyl-5-isopropylbenzene by alkylating pseudocumene with propene in the presence of an aluminum chloride containing catalyst, the improvement which comprises carrying out said alkylation with a reactant mole ratio of propene to pseudocumene of at least about 1 and in the presence of added trimethyldiisopropylbenzenes.

2. Process claimed in claim 1 wherein about 10 to 30 mole percent, based upon pseudocumene, of said diisopropylbenzene is used.

3. Process claimed in claim 1 including reacting excess propene and pseudocumene in a first stage to produce 1,2,4 - trimethyl - 5 - isopropylbenzene and trimethyldiisopropylbenzenes; separating said isopropyl and diisopropylbenzenes; and introducing said diisopropylbenzenes into a subsequent alkylation.

4. Process claimed in claim 1 wherein said reactant mole ratio is about 1.

5. Process claimed in claim 1 including reacting pseudocumene and said diisopropylbenzenes in the presence of said aluminum chloride catalyst and then adding alkylating propene to said reaction.

6. Process claimed in claim 1 carried out at about 30 to 50° C.

7. Process claimed in claim 3 wherein the reactant mole ratio of propene to pseudocumene is about 1:1.25 in said first stage and the subsequent reactant mole ratio is about 1.

References Cited

UNITED STATES PATENTS 2,920,118   1/1960   Landau et al. _____ 260—671
3,306,943   2/1967   Sulo et al. _____ 260—671

FOREIGN PATENTS 1,460,349   10/1966   France.

DELBERT E. GANTZ, Primary Examiner

C. R. DAVIS, Assistant Examiner